United States Patent
Joshi et al.

(10) Patent No.: US 6,671,826 B1
(45) Date of Patent: Dec. 30, 2003

(54) FAST DATABASE STATE DUMPS TO FILE FOR DEFERRED ANALYSIS OF A DATABASE

(75) Inventors: Vikram Joshi, Los Gatos, CA (US); Alex Tsukerman, Foster City, CA (US); Shari Yamaguchi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 436 days.

(21) Appl. No.: 09/717,162

(22) Filed: Nov. 20, 2000

Related U.S. Application Data

(60) Provisional application No. 60/166,598, filed on Nov. 19, 1999.

(51) Int. Cl.[7] ............................................. G06F 11/00
(52) U.S. Cl. ................................. 714/38; 707/101
(58) Field of Search ........................ 714/38, 39, 41, 714/45, 35; 707/101, 200–206, 102

(56) References Cited

U.S. PATENT DOCUMENTS

| | | | | |
|---|---|---|---|---|
| 5,129,082 A | * | 7/1992 | Tirfing et al. ................ | 707/3 |
| 5,197,005 A | * | 3/1993 | Shwartz et al. .............. | 707/2 |
| 5,561,763 A | * | 10/1996 | Eto et al. ..................... | 714/35 |
| 5,854,924 A | * | 12/1998 | Rickel et al. ................ | 717/132 |
| 5,974,418 A | * | 10/1999 | Blinn et al. ................. | 707/100 |
| 6,085,029 A | | 7/2000 | Kolawa et al. | |
| 6,108,659 A | * | 8/2000 | Vincent ....................... | 707/101 |
| 6,163,858 A | | 12/2000 | Bodamer | |
| 6,226,787 B1 | | 5/2001 | Serra et al. | |
| 6,378,124 B1 | | 4/2002 | Bates et al. | |
| 6,412,106 B1 | | 6/2002 | Leask et al. | |
| 6,542,844 B1 | | 4/2003 | Hanna | |

OTHER PUBLICATIONS

"Solaris 2.6 Reference Manual AnswerBook>>man pp.(3): Library Routines", 5 pages, 2001, http://docs.sun.com:80/ab2/@LegacyPageView?toc=SUNWab_40_4%3A%Fsafedir%Fsp.

* cited by examiner

*Primary Examiner*—Nadeem Iqbal
(74) *Attorney, Agent, or Firm*—Hickman Palermo Truong & Becker LLP; Edward A. Becker

(57) ABSTRACT

In one embodiment, the method of debugging a software program comprises preserving a memory state of a portion of the software program, such as a database system. The memory state is preserved when a failure event is detected in the software program. The preserved memory state portion of the software program is extracted and stored in a storage medium for deferred analysis. Normal database operations are resumed as soon as the memory state is preserved. The deferred analysis is performed by starting a new database instance corresponding to the preserved memory state portion and using the new database instance to extract information for high-level debugging of the software program. Thus, where downtime of a software program must be kept to a minimum, the present invention provides techniques for performing quick diagnostics of the software program.

10 Claims, 6 Drawing Sheets

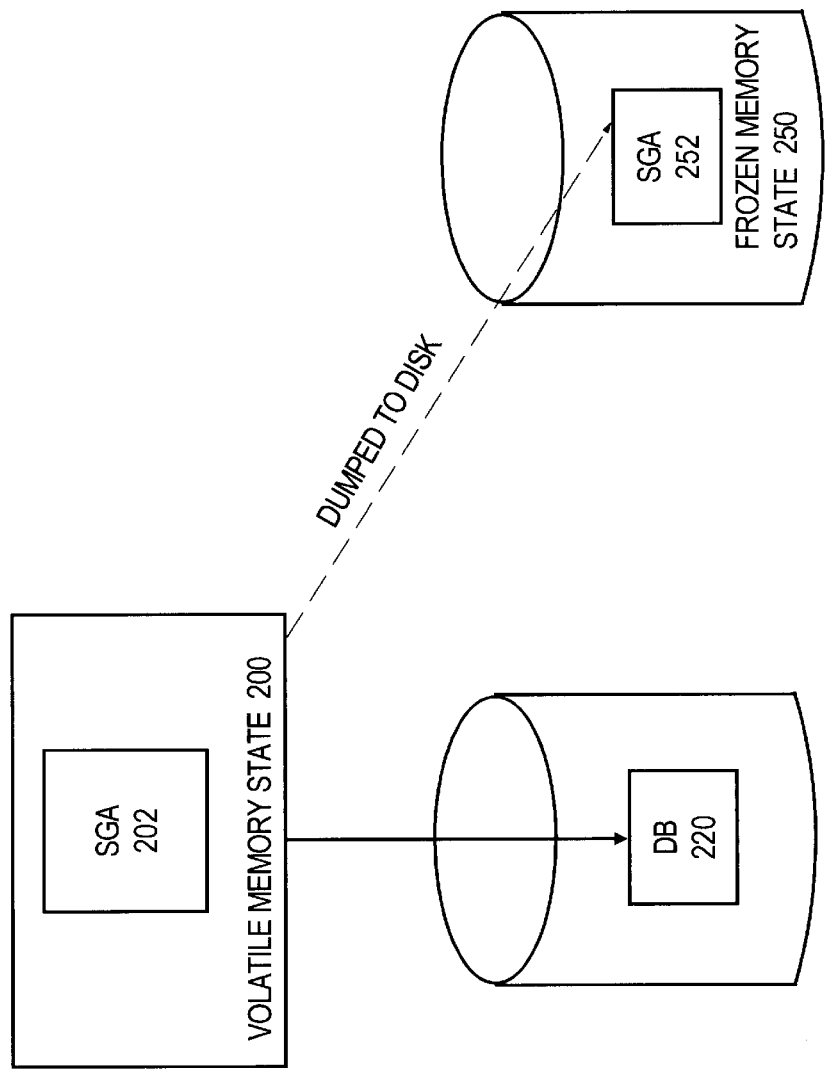

FAST DATABASE STATE DUMPS TO FILE FOR DEFERRED ANALYSIS OF A DATABASE

CROSS REFERENCE TO RELATED APPLICATIONS

This application is related to and claims domestic priority under 35 U.S.C. §119(e) from prior U.S. Provisional Patent Application Ser. No. 60/166,598 filed on Nov. 19, 1999 entitled "Debugging Techniques And Fast SGA Dumps For Deferred Analysis Of The Database", by inventors Vikram Joshi, Alex Tsukerman, and Shari Yamaguchi, the entire disclosure of which is hereby incorporated by reference as if fully set forth herein.

This application is related to U.S. patent application Ser. No. 09/649,310 filed on Aug. 28, 2000 entitled "Method And Apparatus For Debugging A Software Program", by inventors Vikram Joshi, Alex Tsukerinan, and Shari Yamaguchi, the entire disclosure of which is hereby incorporated by reference as if fully set forth herein.

This application is related to U.S. patent application Ser. No. 09/717,187, filed on the same day herewith entitled "Method and Apparatus for Debugging a Software Program Using Dynamic Debug Patches and Copy on Write Views", by inventors Vikram Joshi, Alex Tsukerman, and Shari Yamaguchi, the entire disclosure of which is hereby incorporated by reference as if fully set forth herein.

This application is related to U.S. patent application Ser. No. 09/717,161, filed on the same day herewith entitled "A Debug and Data Collection Mechanism Utilizing a Difference in Database State by Using Consecutive Snapshots of a Database State", by inventors Vikram Joshi, Alex Tsukerman, and Shari Yamaguchi, the entire disclosure of which is hereby incorporated by reference as if fully set forth herein.

FIELD OF THE INVENTION

The present invention generally relates to debugging software programs and, more specifically, to techniques for debugging database systems.

BACKGROUND OF THE INVENTION

In a database system, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database "server" or "instance".

Like most software systems, a database server has complicated shared memory structures. A shared memory structure contains data and control information for a portion of a database system. Because of software, hardware, or firmware bugs that may exist in a complex database system, shared memory structures may become logically incorrect. When structures become logically incorrect, the database is likely to fail. Database failure is typically discovered in the following ways: by checking consistency of structures; by verifying certain assumptions; or by running into corrupted pointers. Attempting to process corrupted pointers will lead to a "crash," where normal database operation is no longer possible.

A major responsibility of the database administrator is to be prepared for the possibility of hardware, software, network, process, or system failure. When shared structures are presumed to be corrupted, the best course of action for a database administrator is to cease further processing of the database. If a failure occurs such that the operation of a database system is affected, the administrator must usually recover the database and return the database to normal operations as quickly as possible. Recovery should protect the database and associated users from unnecessary problems and avoid or reduce the possibility of having to duplicate work manually.

Recovery processes vary depending on the type of failure that occurred, the structures affected, and the type of recovery that is performed. If no files are lost or damaged, recovery may amount to no more than rebooting the database system. On the other hand, if data has been lost, recovery requires additional steps in order to put the database back into normal working order.

Once the database is recovered or rebooted, the immediate problem is quickly resolved, but because the root cause is still undetermined and therefore unresolved, the error condition may resurface, potentially causing several additional outages. Therefore, it is still important to diagnose the state of the structures and data surrounding the database failure. Such a diagnosis may provide valuable information that can reduce the chance of failure in the future. As a practical matter, diagnosing the failure may lead to determining which vendor's hardware or software is responsible for the database failure. Such information is valuable for a vendor's peace of mind, if nothing else. Thus, competing with the goal of recovering the database as quickly as possible, is the goal of determining why the database system failed in the first place.

Unfortunately, even with traditional techniques of diagnosing a database failure, the system administrator is usually unable to obtain a sufficient amount of clues to determine why the failure happened. A deliberate and thorough diagnosis of the failure may require an unacceptable amount of database downtime. For example, any amount of downtime over 30 minutes may be extremely costly for a database that is associated with a highly active web site. Too much downtime may have unduly expensive business ramifications, such as lost revenue and damage to the reputation of the web site owner.

Traditional debugging techniques involve formatting certain parts of the database system and displaying this formatted portion in a human-readable form. This human-readable form can be set aside for later analysis, for example, after the database has been recovered or is no longer down. The entire memory of the database server is not dumped because an average database server is very large, typically between about 200 megabytes and about 100 gigabytes of unformatted binary and data. On the portion of the database that is dumped and formatted, an educated guess is made of the key data structures that are potential causes of the problem.

For the foregoing reasons, what is needed is a method of debugging a software program, such as a database system, that can be performed in a manner that requires minimal downtime, yet allows for a comprehensive assessment of a failure.

SUMMARY OF THE INVENTION

In one embodiment, the method of debugging a software program comprises preserving a memory state of a portion of the software program, such as a database system. The memory state is preserved when a failure event is detected in the software program. The preserved memory state portion of the software program is extracted and stored in a storage medium for deferred analysis. Normal database operations are resumed as soon as the memory state is preserved. The deferred analysis is performed by starting a new database instance corresponding to the preserved memory state portion and using the new database instance to extract information for high-level debugging of the software program. Thus, where downtime of a software program must be kept to a minimum, the present invention provides techniques for performing quick diagnostics of the software program.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B is a block diagram that illustrates the database system after the database system failed;

DETAILED DESCRIPTION OF THE PREFERRED EMBODIMENT

Techniques for non-intrusive debugging of a software program are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

DEBUGGING TECHNIQUE

The ability to defer analysis of a failed analysis allows for quick recovery of the database. For example, a database customer may resume running the database while leaving the task of failure analysis to be performed at a later time by database experts.

Figure 1:
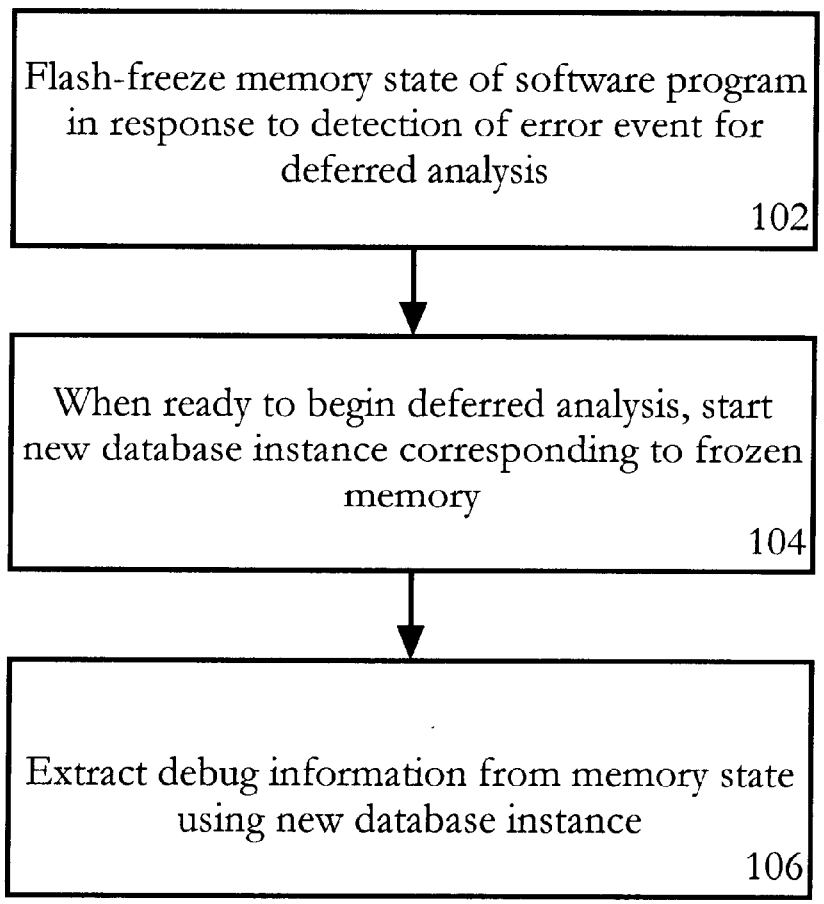
FIG. 1 a flowchart that illustrates a method of debugging a software program.

FIG. 1 is a flowchart that illustrates a method of debugging a software program. At block 102, a memory state of the software program is flash-frozen for preservation. In certain embodiments of the invention, the memory state that is flash-frozen includes a group of shared memory structures that contain data and metadata. The metadata contains information that includes initialization parameters for initializing the software program, control information, and information for interpreting the preserved memory state portion of the software program.

For the purpose of explanation, it will be assumed that the software program is a database server, and the memory state of the database is herein referred to as a Shared Group Area ("SGA"). However, the present techniques are not limited to any particular type of software program. Preserving the SGA may include suspending a failed process within the database system. Various techniques may be used to flash-freeze the state of a database server. One such technique is described in U.S. patent application Ser. No. 09/223,660 entitled "METHOD AND SYSTEM FOR DIAGNOSTIC PRESERVATION OF THE STATE OF A COMPUTER SYSTEM" filed by Wei Hu and Juan Loaiza on Dec. 30, 1998, the contents of which is incorporated herein by reference.

Flash-freezing the database may be initiated by giving the database an explicit "freeze" user command. Alternatively, flash-freezing the database may be initiated in response to an automatic trigger that fires when an error event is detected.

In certain embodiments, the flash-frozen SGA is dumped to a storage medium for deferred analysis. The flash-frozen SGA may be transported to a different machine for analysis in order to insulate the machine from which the flash-frozen SGA was dumped from debug operations that are part of the deferred analysis. At block 104 of FIG. 1, in order to begin the deferred analysis, a new database instance corresponding to the frozen SGA is started. At block 106, analysis begins by extracting information from the SGA for use in debug operations using the new database instance.

Examples of the kinds of information that may be extracted from the SGA by using the new database instance include identifying the database processes that hold latches to shared resources. Assume that previously the database system had reached a hung state, at which point the database system was flash-frozen in order to preserve the SGA. Upon deferred analysis, the database manager issues a command to the new database instance to cause all the latches and corresponding owners of the latches in the system to be identified. By extracting latch ownership information, it may be discovered that one of the processes in the system was trying to obtain a latch that was already held by another process in the system, thus resulting in the hung state of the database system.

Other examples of the kinds of information that may be extracted from the SGA by using the new database instance include information on the number of I/Os that occurred, log buffers, process state objects, data blocks residing in the buffer cache and the corresponding status of each data block in the buffer cache, and the contents of the library cache. The information extracted from the SGA may help identify the cause of the error event that triggered the flash-freeze. For example, if it is discovered from the SGA that a block of data with a "current" status occurs twice in the buffer cache, then further investigation into possible causes for the two occurrences of the same data block with "current" status in the buffer cache is warranted. Further, the series of SQL statements that led to the error event that triggered the flash-freeze is stored in the library cache in the SGA. By examining the SQL statements and the corresponding execution plans, more insight may be obtained as to the nature of the error that triggered the flash-freeze. The SGA may also contain various other data structures that may be examined by issuing appropriate SQL commands using the new database instance.

Figure 2A:
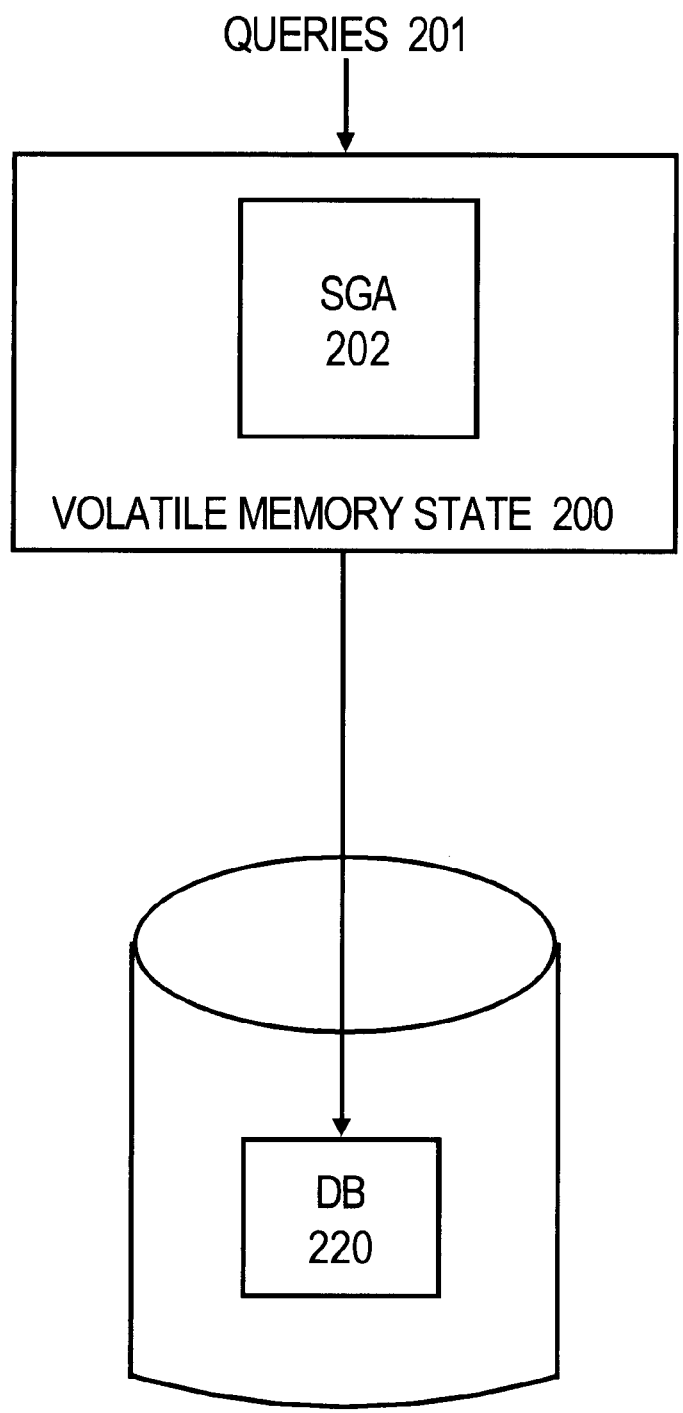
FIG. 2A is a block diagram that illustrates a database system before the database system failed.
Figure 2C:
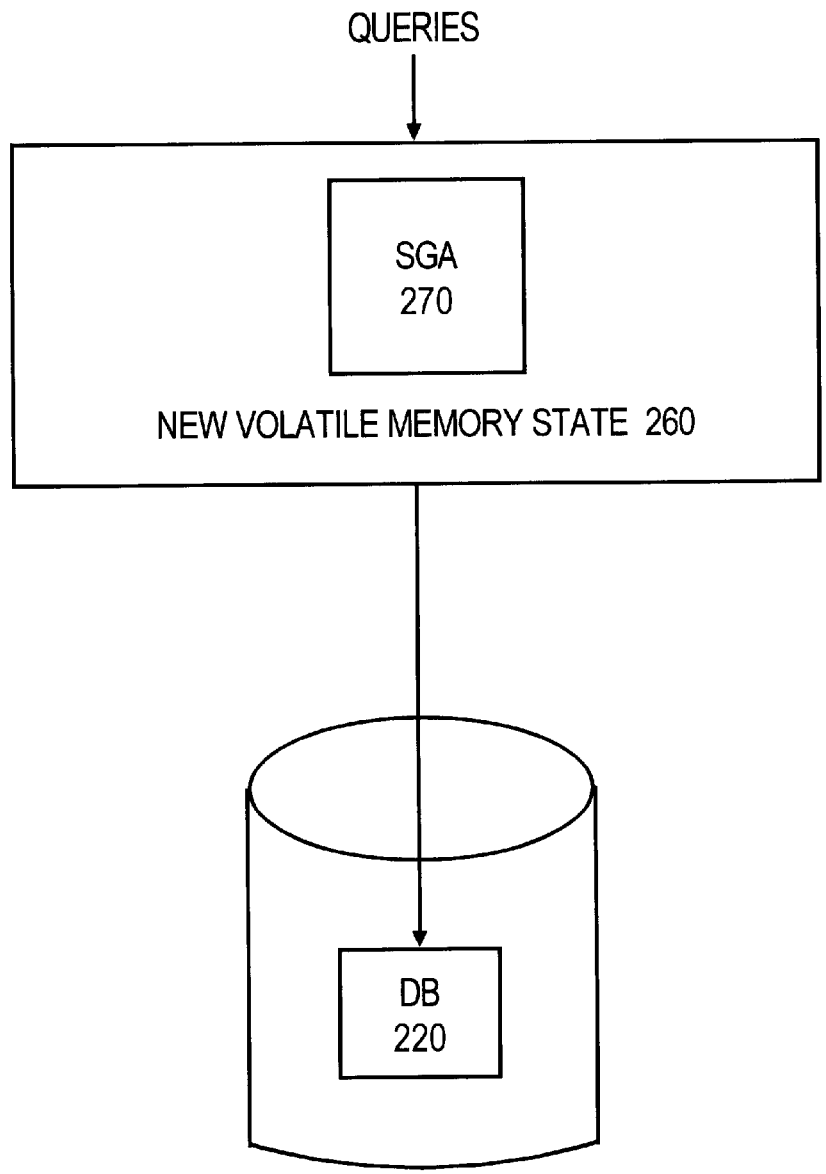
FIG. 2C is a block diagram of the database system after recovery from failure.
Figure 2D:
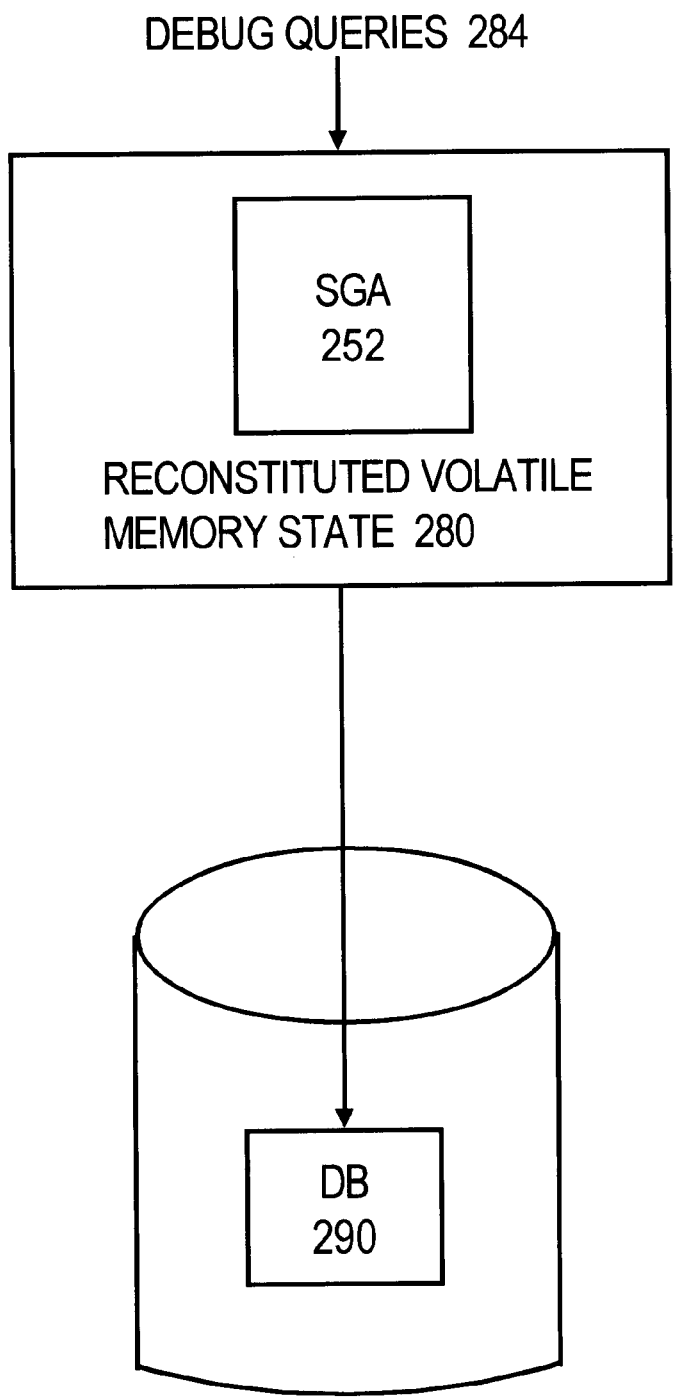
FIG. 2D is a block diagram of a debug system that comprises a reconstituted volatile memory state.

FIG. 2A is a block diagram that illustrates a database system before the database system failed. A volatile memory state 200 is logically connected to persistent database storage 220. Volatile memory state 200 includes SGA 202. Queries 201, such as SQL commands, may be submitted to volatile memory state 200. FIG. 2B is a block diagram that illustrates the database system after the database system failed. Volatile memory state 200 including SGA 202 is flash-frozen and dumped to disk and stored as frozen memory state 250 that includes a frozen SGA 252. FIG. 2C is a block diagram of the database system after recovery from failure. For example, after volatile memory state 200 including SGA 202 of FIG. 2B is flash-frozen and dumped to disk, the database system may be re-booted to start a new volatile memory state 260 that includes SGA 270 of FIG. 2C. FIG. 2D is a block diagram of a debug system that comprises a reconstituted volatile memory state 280 that includes the previously frozen SGA 252. Reconstituted volatile memory state is logically connected to persistent database storage 290. Debug queries 284, are submitted to reconstituted volatile memory state 280. The debug queries are used to extract the information from SGA 252 to help identify the error event that caused the failure in the original database system.

HARDWARE OVERVIEW

Figure 3:
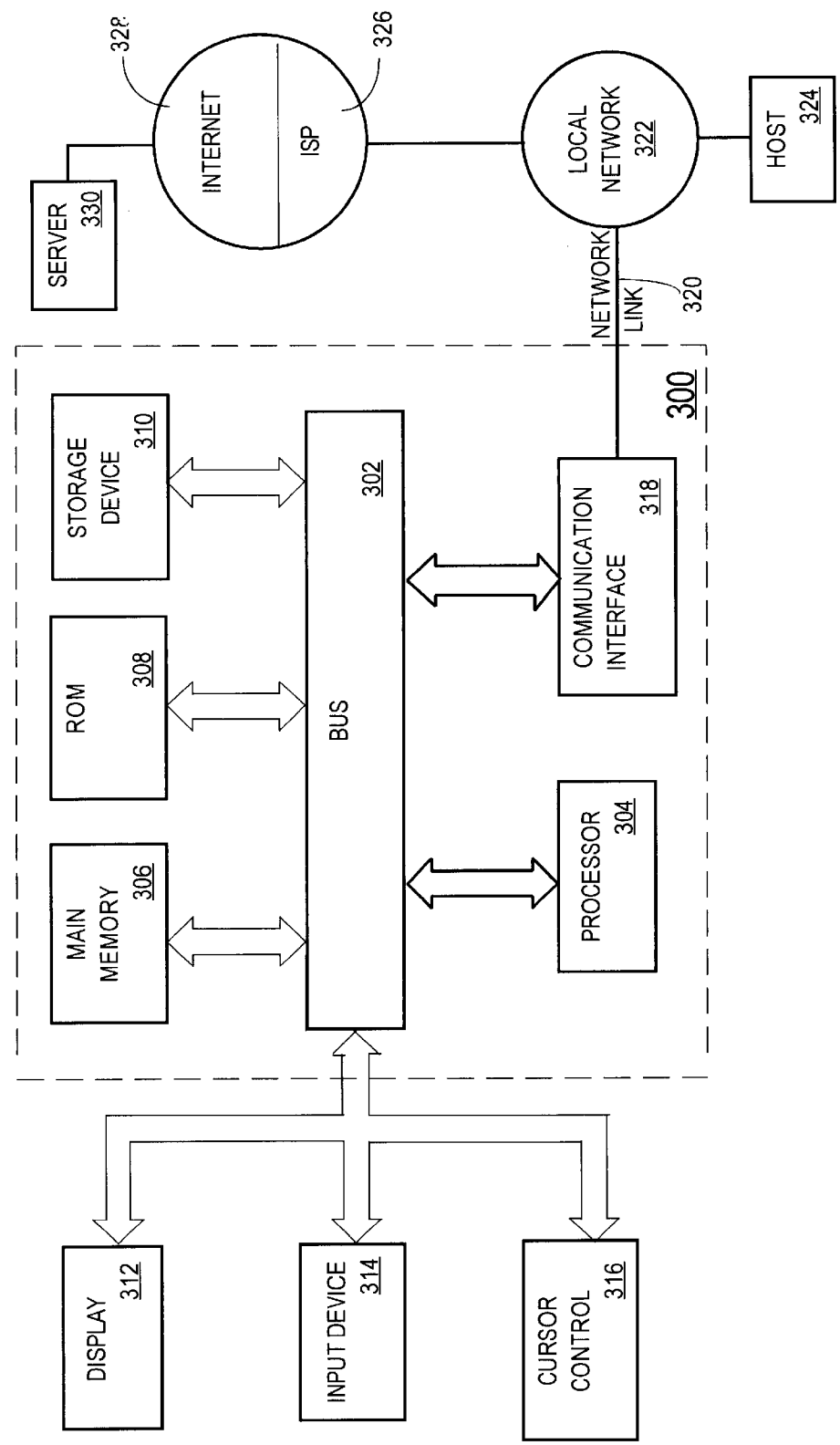
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of debugging a database system, the method comprising the steps of:
    preventing modification to a first set of data stored in volatile memory, wherein the first set of data includes at least a portion of volatile memory state of a first database system;
    durably storing a second set of data that includes at least a portion of said first set of data;
    using the second set of data to cause a volatile memory state of a second database system to at least partially reflect the volatile memory state of the first database system; and
    using the second database system to extract high-level debug information relating to the first database system.

2. The method of claim 1 wherein the step of using the second database system to extract high-level debug information relating to the first database system includes issuing queries to the second database system.

3. The method of claim 1 further comprising the steps of:
    executing the first database system on a first machine; and
    executing the second database system on a second machine that is separate from said first machine.

4. The method of claim 3 further comprising the step of recovering the first database system on said first machine after durably storing said second set of data and prior to executing said second database system on said second machine.

5. The method of claim 1, wherein the first set of data includes a group of shared memory structures that contain data and metadata, wherein the metadata includes initialization parameters for initializing the first database system, control information, and information for interpreting the preserved memory state portion of the first database system for use in the debugging operations.

6. A computer-readable medium bearing instructions for debugging a database system, the instructions arranged, when executed by one or more processors, to cause the one or more processors to perform the steps of:
    preventing modification to a first set of data stored in volatile memory, wherein the first set of data includes at least a portion of volatile memory state of a first database system;
    durably storing a second set of data that includes at least a portion of said first set of data;
    using the second set of data to cause a volatile memory state of a second database system to at least partially reflect the volatile memory state of the first database system; and
    using the second database system to extract high-level debug information relating to the first database system.

7. The computer-readable medium of claim 6 wherein the step of using the second database system to extract high-level debug information relating to the first database system includes issuing queries to the second database system.

8. The computer-readable medium of claim 6 further comprising the steps of:
    executing the first database system on a first machine; and
    executing the second database system on a second machine that is separate from said first machine.

9. The computer-readable medium of claim 8 further comprising the step of recovering the first database system on said first machine after durably storing said second set of data and prior to executing said second database system on said second machine.

10. The computer-readable medium of claim 6, wherein the first set of data includes a group of shared memory structures that contain data and metadata, wherein the metadata includes initialization parameters for initializing the first database system, control information, and information for interpreting the preserved memory state portion of the first database system for use in the debugging operations.

* * * * *

UNITED STATES PATENT AND TRADEMARK OFFICE
CERTIFICATE OF CORRECTION

PATENT NO.    : 6,671,826 B1                                             Page 1 of 1
DATED         : December 30, 2003
INVENTOR(S)   : Vikram Joshi et al.

It is certified that error appears in the above-identified patent and that said Letters Patent is hereby corrected as shown below:

<u>Title page,</u>
Item [56], References Cited, U.S. PATENT DOCUMENTS, add the following:
--

| | | | |
|---|---|---|---|
| 5,437,027 | | Bannon et al. | 07-25-1995 |
| 5,613,098 | | Landau et al. | 03-18-1997 |
| 5,675,803 | | Preisler et al. | 10-07-1997 |
| 5,781,776 | | Johnston et al. | 07-14-1998 |
| 5,946,689 | | Yanaka et al. | 08-31-1999 |
| 5,950,198 | | Falls et al. | 09-07-1999 |
| 6,003,143 | | Kim et al. | 12-14-1999 |
| 6,029,178 | | Martin et al. | 02-22-2000 |
| 6,112,025 | | Mulchandani et al. | 08-29-2000 |
| 6,167,535 | | Foot et al. | 12-26-2000 |
| 6,216,237 | B1 | Klemm et al. | 04-10-2001 |
| 6,263,491 | B1 | Hunt | 07-17-2001 |
| 6,330,670 | B1 | England | 12-11-2001 |
| 6,374,268 | B1 | Testardi | 04-16-2002 |
| 6,397,125 | B1 | Goldring et al. | 05-28-2002 |
| 6,463,578 | B1 | Johnson | 10-08-2002 |
| 6,490,721 | B1 | Gorshkov et al. | 12-03-2002 |
| 2003/0004952 A1 | | Nixon et al. | 01-02-2003  -- |

Signed and Sealed this

First Day of June, 2004

JON W. DUDAS
*Acting Director of the United States Patent and Trademark Office*